(12) United States Patent
Fujihashi

(10) Patent No.: US 6,478,205 B1
(45) Date of Patent: Nov. 12, 2002

(54) CASE FOR PORTABLE TELEPHONES

(76) Inventor: Kouichiro Fujihashi, c/o Kabushiki Kaisha Kanagawa Housei Shoukai, 2-6, Daimachi, Kanagawa-ku, Yokohama-shi, Kanagawa-ken (JP)

( * ) Notice: Subject to any disclaimer, the term of this patent is extended or adjusted under 35 U.S.C. 154(b) by 0 days.

(21) Appl. No.: 09/600,538
(22) PCT Filed: Jan. 20, 1999
(86) PCT No.: PCT/JP99/00171
§ 371 (c)(1),
(2), (4) Date: Jul. 18, 2000
(87) PCT Pub. No.: WO99/35932
PCT Pub. Date: Jul. 22, 1999

(30) Foreign Application Priority Data

Jan. 20, 1998 (JP) .......................................... 10-008733
Dec. 17, 1998 (JP) .......................................... 10-359544

(51) Int. Cl.[7] ................................................. A45C 1/04
(52) U.S. Cl. ........................ 224/675; 224/236; 224/240; 224/677; 224/680; 224/681
(58) Field of Search ........................... D3/218; 224/674, 224/675, 677, 680, 681, 236, 240

(56) References Cited

U.S. PATENT DOCUMENTS

| | | | | |
|---|---|---|---|---|
| 4,572,415 A | * | 2/1986 | Fehr ............................. 224/523 |
| 4,662,552 A | * | 5/1987 | Uyehara ....................... 224/251 |
| D302,075 S | * | 7/1989 | Burger ......................... D3/106 |
| 4,898,310 A | * | 2/1990 | Remington .................. 224/238 |
| 4,974,763 A | * | 12/1990 | Widrig ......................... 15/105 |
| 5,009,348 A | * | 4/1991 | Derkatz ....................... 224/232 |
| D320,714 S | * | 10/1991 | Singley ........................ D6/553 |
| 5,341,975 A | * | 8/1994 | Marinescu ................... 224/269 |
| D377,117 S | * | 1/1997 | Klassen ....................... D3/218 |
| 5,653,367 A | * | 8/1997 | Abramson ................... 224/581 |
| 5,731,963 A | * | 3/1998 | Heiss et al. .................. 361/814 |
| 5,779,122 A | * | 7/1998 | Martinelli .................... 224/683 |
| 5,899,371 A | * | 5/1999 | Weliver ....................... 150/112 |
| 5,957,357 A | * | 9/1999 | Kallman ...................... 224/675 |
| 5,971,242 A | * | 10/1999 | Schuerman .................. 224/544 |
| D416,132 S | * | 11/1999 | Tan .............................. D3/218 |
| D435,722 S | * | 1/2001 | Pepping ....................... D3/218 |
| 6,182,878 B1 | * | 2/2001 | Racca .......................... 224/605 |
| 6,201,867 B1 | * | 3/2001 | Kolke .......................... 379/433 |
| 6,209,769 B1 | * | 4/2001 | Seals et al. .................. 224/583 |
| 6,244,486 B1 | * | 6/2001 | Holland et al. .............. 224/584 |

* cited by examiner

Primary Examiner—Stephen P. Garbe
(74) Attorney, Agent, or Firm—Jiawei Huang; J.C. Patents

(57) ABSTRACT

A portable telephone set holder is comprised of a portable telephone set housing, a holding section extending from the housing, and a suspending section provided on a rear surface of the housing. The housing has an insertion port, into which a portable telephone set is inserted to be housed. The holding section extends from the insertion port and is provided at a location adjacent to the insertion port, which housing is folded toward a front surface of the housing, and engaged with the housing in a disengageable manner. The suspending section forms a supporter insertion block on the rear surface of the housing in a disengageable manner. A supporter such as a belt is inserted into the supporter insertion block, to thereby suspend the portable telephone set holder. The opening surface of the insertion port of the housing is inclined in one orientation. Further, the supporter insertion block is inclined in the same orientation as the inclined orientation of the opening surface.

10 Claims, 12 Drawing Sheets

CASE FOR PORTABLE TELEPHONES

FIELD OF THE INVENTION

This invention relates to a holder for housing a portable telephone set or the like, and more particularly to a portable telephone set holder which is enhanced in convenience of operation in a case of being carried.

BACKGROUND ART

Conventionally, portable telephone set holders of this kind include one which has the construction such that a housing has an insertion port opening upward, into which a portable telephone set is inserted to be housed, and a holding section which is folded toward a front surface of the housing and engaged with the same, in a disengageable manner, whereby the insertion port is closed. With this construction, the holding section prevents the portable telephone set housed in the housing from slipping out.

When the portable telephone set holder with the conventional construction mentioned above is carried, however, the housing which houses the portable telephone set is ordinarily carried in a handbag, an inner pocket of a business suit, or the like, of the user. Therefore, when the portable telephone set is used, the user has to take the housing out, and further has to take the portable telephone set out of the housing, which is a bother to the user.

Further, there is conventionally proposed a portable telephone set holder in order to enhance the convenience of its operation in a case of being carried. According to the above proposed portable telephone set holder, a supporter insertion passage is provided on a rear surface of the housing, for inserting a supporter such as a belt, and the belt which is worn around the waist of the user is inserted into the supporter insertion passage, to thereby suspend the housing. However, when the housing is attached for suspension to the belt or detached from the same, a bothersome operation of unfastening the belt is demanded every time. Still further, another portable telephone set holder is disclosed, e.g. by Japanese Patent Laid-Open Publication No. Hei9-140431 and Japanese Patent Laid-Open Publication No. Hei9-173126, in which the housing can be attached to a holding element which is placed closer to the belt, in a detachable manner. This portable telephone set holder has an inconvenience, however, that the holding element is rendered visible when the housing is removed from the belt, resulting in damage in the appearance around the belt. In addition, each of the first mentioned portable telephone set holder in which the supporter insertion passage is provided on one part of the housing and the latter mentioned one in which the housing is attached to the holding element which is placed closer to the belt, in a detachable manner, has its housing disposed in a vertical orientation with respect to the belt. As a result, when the user walks, it can touch his abdominal region, etc., and hence he frequently feels it a bother. Besides, when the user is seated, the housing and an antenna of the portable telephone set can be a hindrance to him, and therefore he cannot smoothly take out the portable telephone set, which is another inconvenience.

Therefore, it is an object of the invention to provide a portable telephone set holder which is capable of facilitating operation by the user when a housing thereof is attached for suspension to a supporter such as a belt or detached from the same. It is another object of the invention to provide a portable telephone set holder which is prevented from being a hindrance to the user when the housing is suspended from the belt or when the user is seated. It is a further object of the invention to provide a portable telephone set holder from which a portable telephone set can be smoothly and quickly taken out.

DISCLOSURE OF THE INVENTION

To attain the above objects, the invention provides a portable telephone set holder comprising a portable telephone set housing having an insertion port, for housing a portable telephone set inserted from the insertion port, holding means extending from the housing and being provided at a location adjacent to the insertion port, for engaging with the housing in a disengageable manner, by being folded toward a front surface of the housing, and suspending means for forming a supporter insertion passage into which a supporter is inserted, on a rear surface of the housing in a disengageable manner, wherein an opening surface defined by the insertion port of the housing is inclined in one orientation and the supporter insertion passage is inclined in the same orientation as the one orientation of inclination of the opening surface.

As a result, the portable telephone holder is prevented from being a hindrance to the user even when it is attached for suspension to the supporter such as a belt, or when the user is seated. Further, since the opening surface is inclined and the supporter insertion passage is also inclined in the same orientation as the orientation of the opening surface, the inserted portable telephone set can be smoothly and quickly taken out.

In this portable telephone set holder, the opening surface defined by the insertion port of the housing may be linearly or curvedly inclined.

Further, the invention provides the portable telephone set holder, wherein the housing has a pocket for small articles formed therefor. In this portable telephone set holder, the pocket for small articles may have an open port thereof provided with a slipout preventing member in a closable manner.

Further, the invention provides the portable telephone set holder, wherein the housing has a bottom which has an opening portion formed therein. As a result, the operational ease of taking out the housed portable telephone set is improved.

Preferably, the holding means of the portable telephone set holder according to the invention is made stretchable. More preferably, the housing of the portable telephone set holder according to the invention is formed of a material which is easily transformed. Alternatively, the housing has a girth thereof made extendible and contractile. As a result, the housing can house any type of portable telephone sets in various shapes, which leads to enhanced versatility.

Further, the present invention provides the portable telephone set holder, wherein the suspending means have one end thereof securely attached to the housing and the other end thereof engaged with the housing via engaging elements in a disengageable manner. Alternatively, the present invention provides the portable telephone set holder, wherein the supporter insertion passage is formed by connecting a pair of the suspending means to each other via engaging elements each formed by a surface fastener, in a disengageable manner, the pair of the suspending means each having one end thereof securely attached to the housing, and wherein one of the pair of the suspending means is made stretchable. Still alternatively, the present invention provides the portable telephone set holder, wherein the supporter insertion passage is formed by an insertion strip with required rigidity, the insertion strip having one end thereof securely attached to the housing and the other end thereof formed as a free end, and wherein the supporter insertion passage is formed in a manner of being engageable with the supporter by inserting the supporter from a side of the free end of the insertion strip. As a result, the housing can be mounted on belts with various widths, and further attachment and detachment of the housing with respect to the supporter such as the belt can be facilitated, which dispenses with unfastening of the belt by the user every time.

Still further, the present invention provides the portable telephone set holder, wherein the housing has at least one surface thereof provided with an electromagnetic wave shielding element. As a result, an adverse effect of an electromagnetic wave generated by the portable telephone set on a human body can be prevented.

BEST MODE FOR CARRYING OUT THE INVENTION

Figure 1:
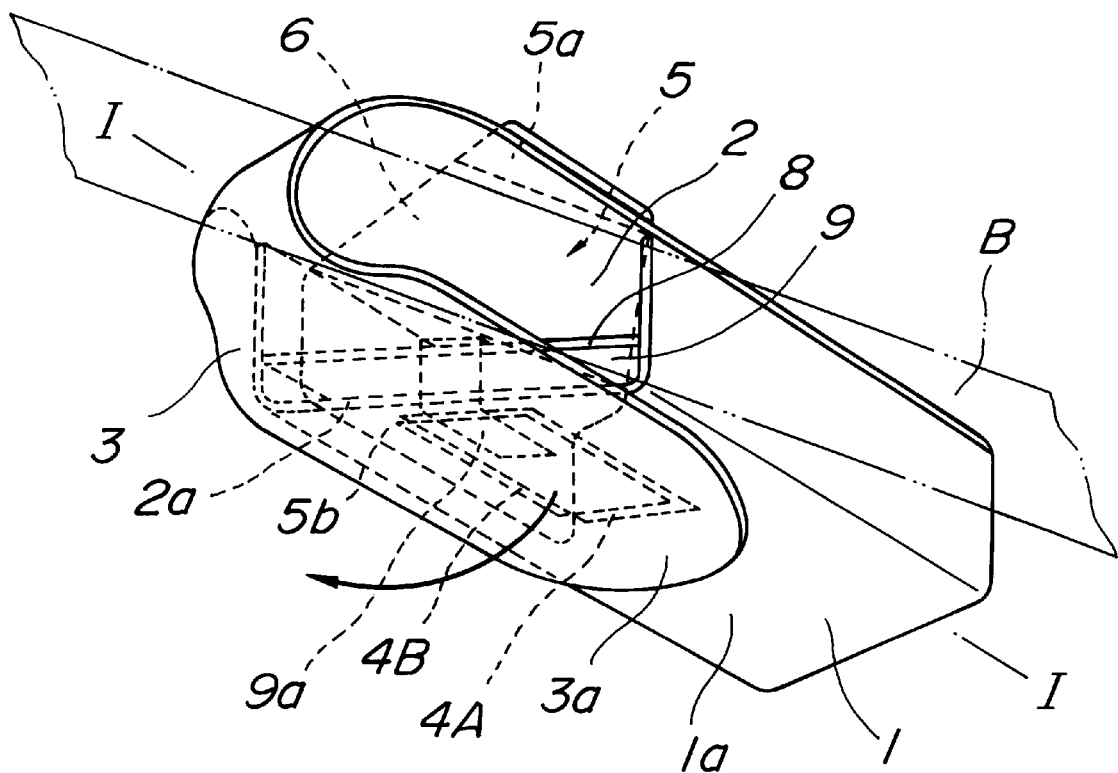
FIG. 1 is a diagram illustrating a portable telephone set holder according to a first embodiment of the invention, in which a holding section thereof is engaged.
Figure 2:
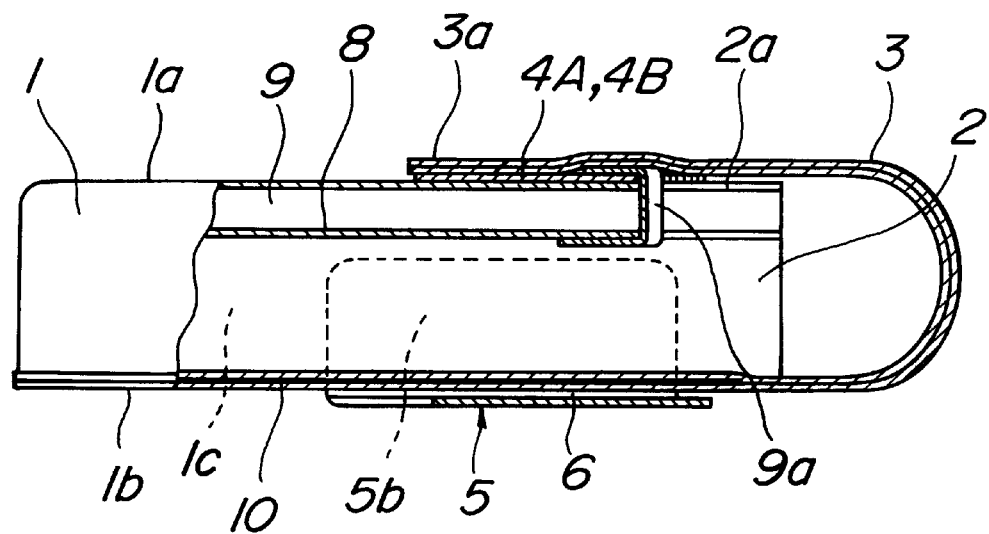
FIG. 2 is a partial cross-sectional view taken along the line I—I in FIG. 1.
Figure 3:
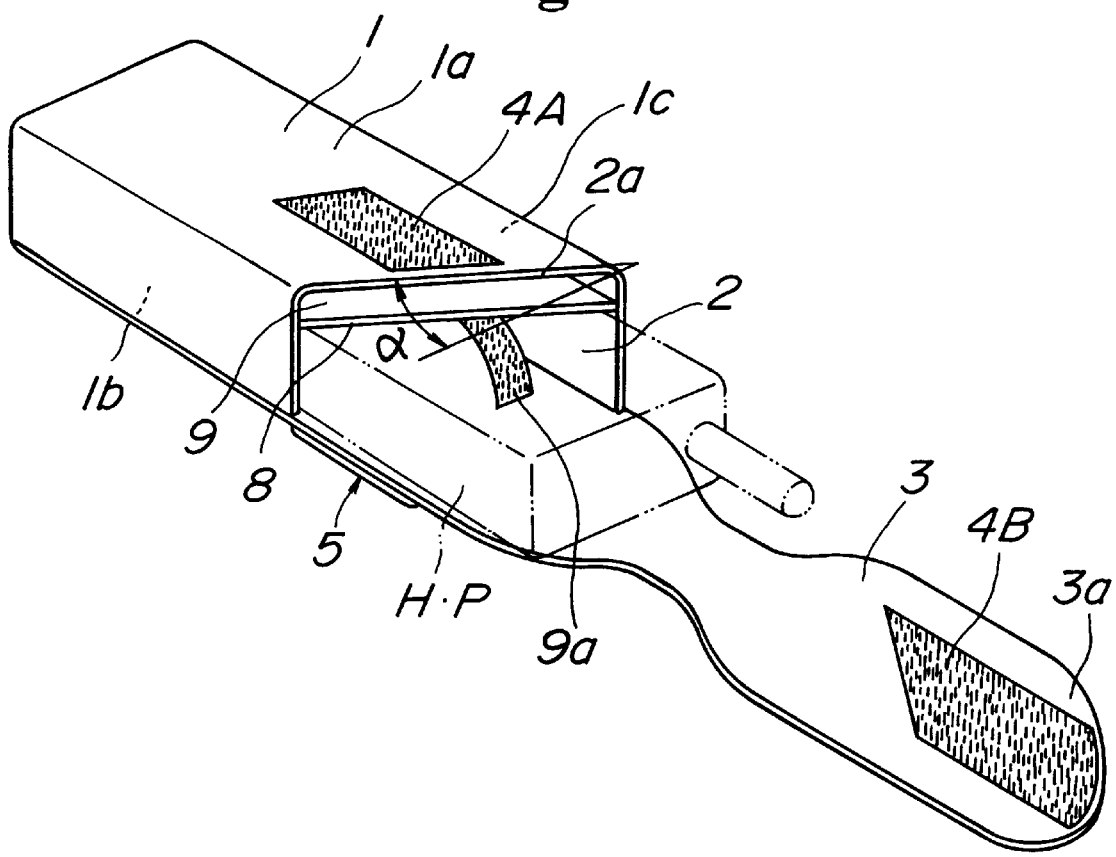
FIG. 3 is a diagram illustrating the portable telephone set holder according to the invention, in which the holding section is disengaged.

The invention will now be described in detail with reference to the drawings showing embodiments thereof. FIGS. 1 to 9 each illustrate a portable telephone set holder according to a first embodiment of the invention. As shown in FIGS. 1 to 3, reference numeral 1 designates a housing for housing a portable telephone set (hereinafter simply referred to as "the housing") formed of a material, such as leather or artificial leather, a woven tape, etc.

The housing 1 has an insertion port 2 opening upward, into which a portable telephone set H.P (handy phone) is inserted to be housed. The insertion port 2 has a cut edge 2a defining an opening surface thereof, such that the opening surface is inclined, as shown in FIG. 3, with respect to a surface orthogonal to the direction of inserting the portable telephone set with an angle of inclination of a with respect to a side edge of the cut edge as an axis.

Further, the insertion port 2 of the housing 1 has a belt-shaped holding section 3 in a fashion of being foldable and unfoldable toward and from a front surface 1a of the housing. The holding section 3 has a folding end portion 3a, which is provided with an engaging element 4B formed, e.g. by a surface fastener. Further, the housing front surface 1a is provided with an engaging element 4A pairing up with the engaging element 4B, so that the holding section 3 can be engaged with the housing front surface 1a. The engagement of the holding section 3 with the housing front surface 1a can prevent the portable telephone set H.P from slipping out of the housing 1. Further, disengagement of the holding section 3 from an engaged state thereof makes it possible to take the portable telephone set H.P out of the housing 1 (see the arrow shown in FIG. 1).

In the present embodiment, as indicated in FIG. 2, the holding section 3 is formed by laminating two sheets of leather or the like. The leather on the side of a rear surface may have a slit formed therein, and a thin plate marked with letters such as initials, or figures may be inserted between the laminated sheets of the leather. Alternatively, if a pocket is provided for the holding section 3, stated hereinafter with reference to FIG. 15, the plate mentioned above may be inserted into the pocket. On this occasion, the insertion of the plate brings an effect that the marked letters or figures appear in an embossed fashion, as if they were embossed on an external front surface of the leather. Further, the user can arbitrarily insert a plate prepared by combining initial plates after purchasing the portable telephone set holder, which makes it possible for the user to easily create a portable telephone set holder with a special appearance without difficulty.

Figure 4:
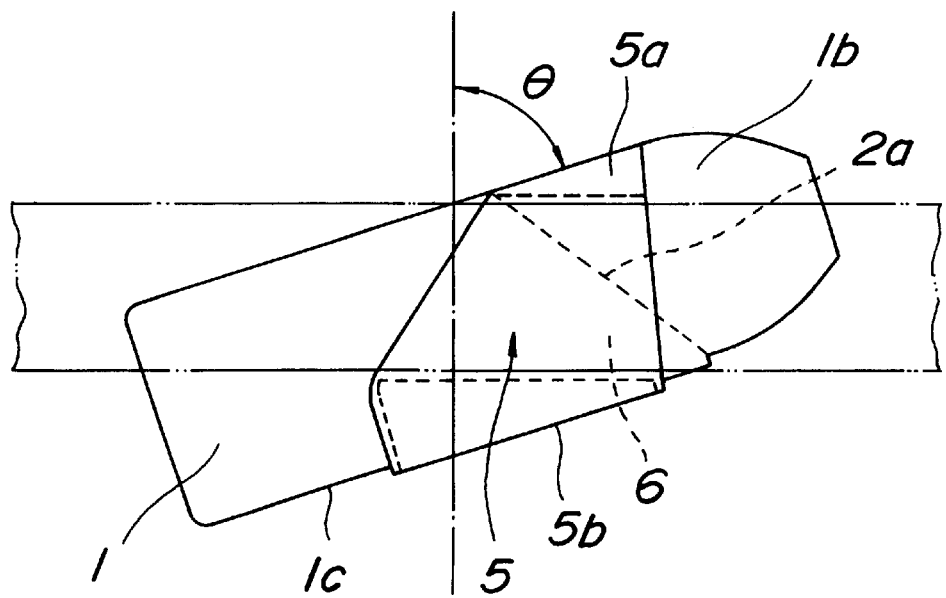
FIG. 4 is a back view showing the portable telephone set holder according to the invention, in which a suspending section thereof is engaged.
Figure 5:
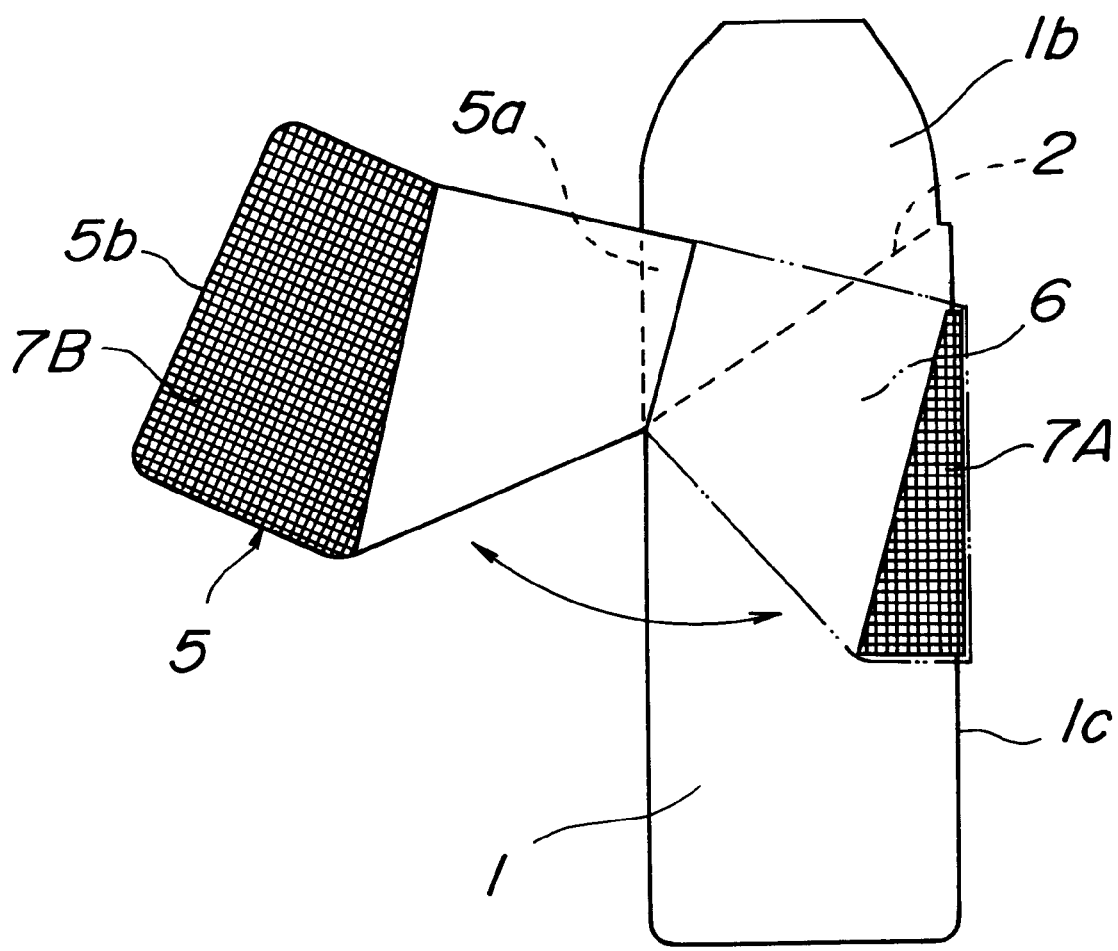
FIG. 5 is a back view showing the portable telephone set holder according to the invention, in which a supporter insertion passage formed by the suspending section is disengaged.

On the other hand, as shown in FIGS. 4 and 5, there is provided a suspending section 5 on a rear surface 1b of the housing 1. The suspending section 5 has one end 5a thereof secured to the housing rear surface 1b and the other end 5b thereof folded, so that a supporter insertion passage 6 is formed, into which a belt B as a supporter is inserted. In the present embodiment, a folding portion at the other end 5b of the suspending section 5 is folded so as to wrap the housing 1 from the rear surface 1b to a side surface 1c of the housing 1. To this end, by arranging engaging elements 7A and 7B each formed, e.g. by a surface fastener, on the housing 1 and the other end 5b, respectively, the folding portion is engaged in a disengageable manner.

Further, the supporter insertion passage 6 formed by folding the suspending section 5 is inclined with an angle of inclination of θ in the same orientation as the inclination of the opening surface defined by the cut edge 2a of the insertion port of the housing 1 so that the belt B is inserted. By this inclination, as indicated by the double broken lines in FIG. 1, when the belt B is held in a horizontal fashion, the housing 1 maintains a backward-leaning state according to the angle of inclination of θ assumed by the supporter insertion passage 6. In addition, the opening surface is set to open upward.

Figure 6A:
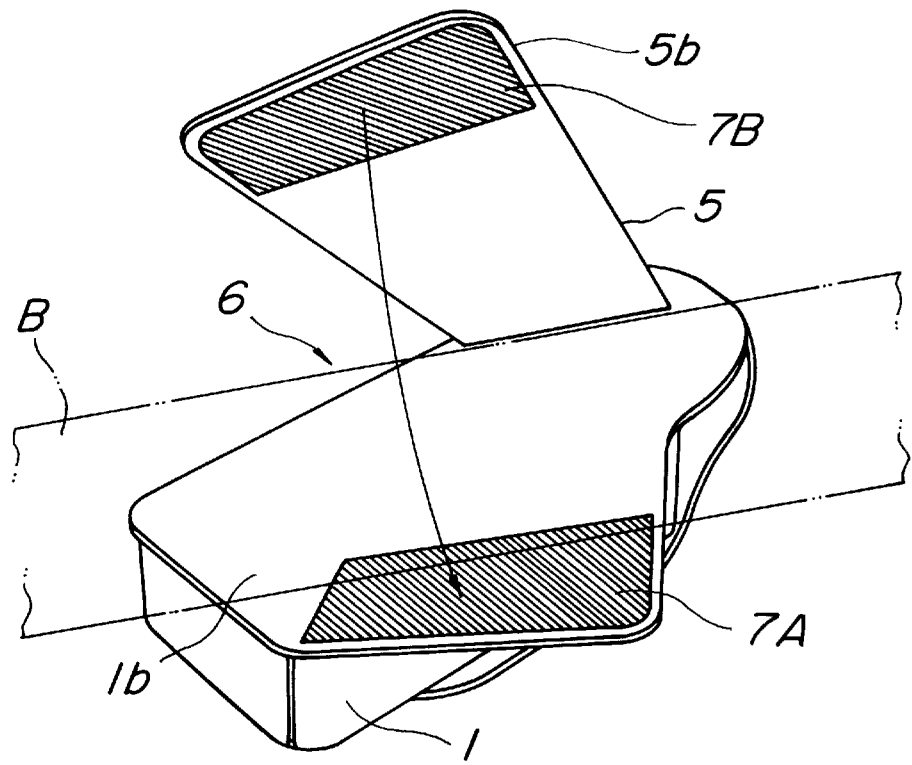
FIGS. 6A and 6B are diagrams showing variations of the portable telephone set holder according to the invention, in which the suspending sections are each varied.
Figure 6B:
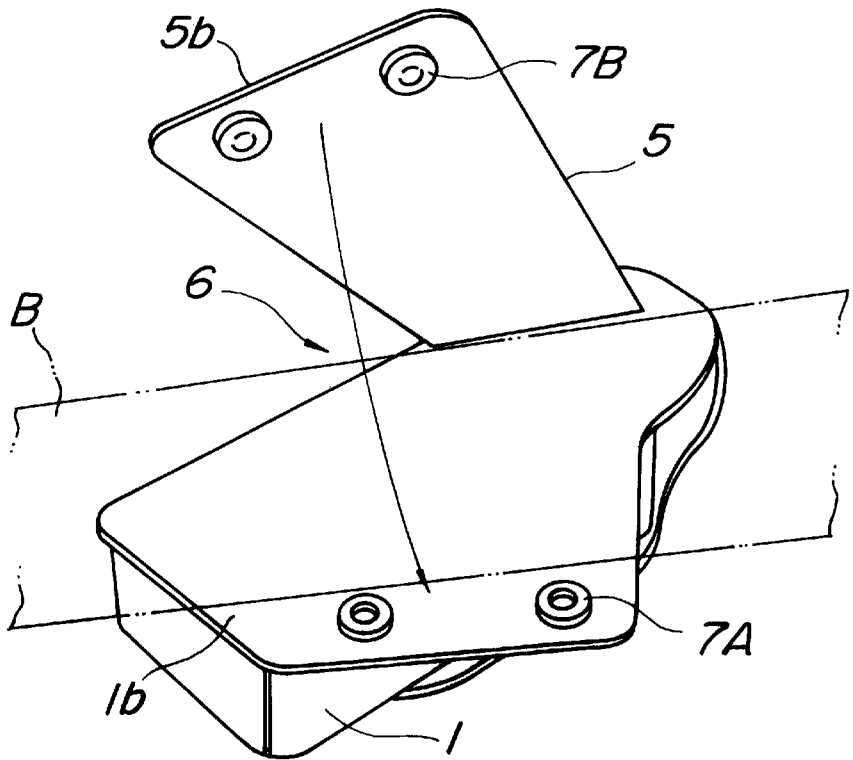
Figure 7:
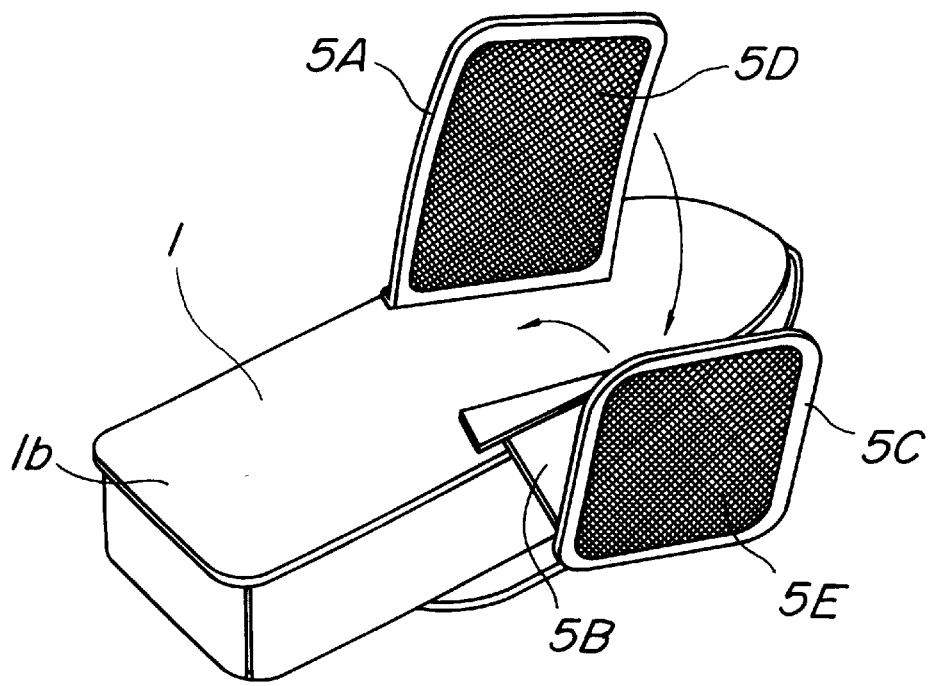
FIG. 7 is a diagram showing a variation of the portable telephone set holder according to the invention, in which the suspending section is varied.
Figure 8:
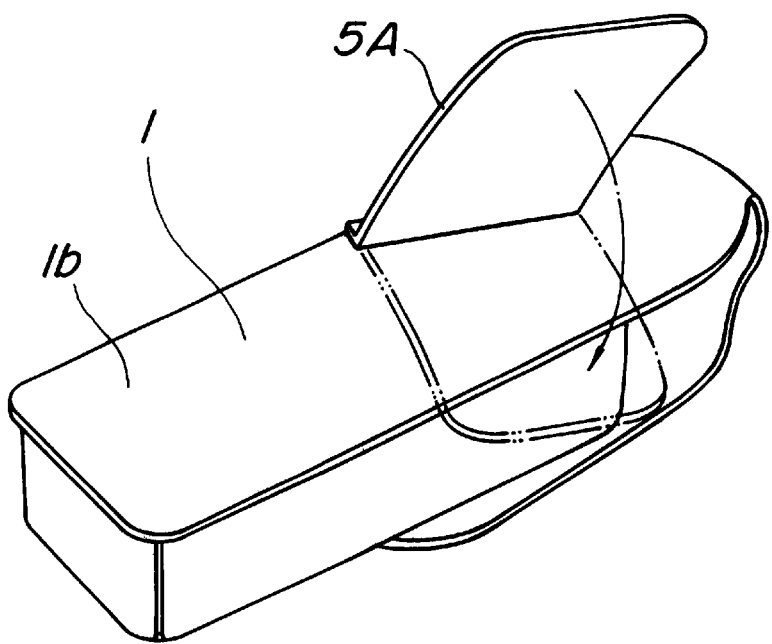
FIG. 8 is a diagram illustrating the portable telephone set holder according to the invention, which has an insertion strip provided therewith as the suspending section.
Figure 9:
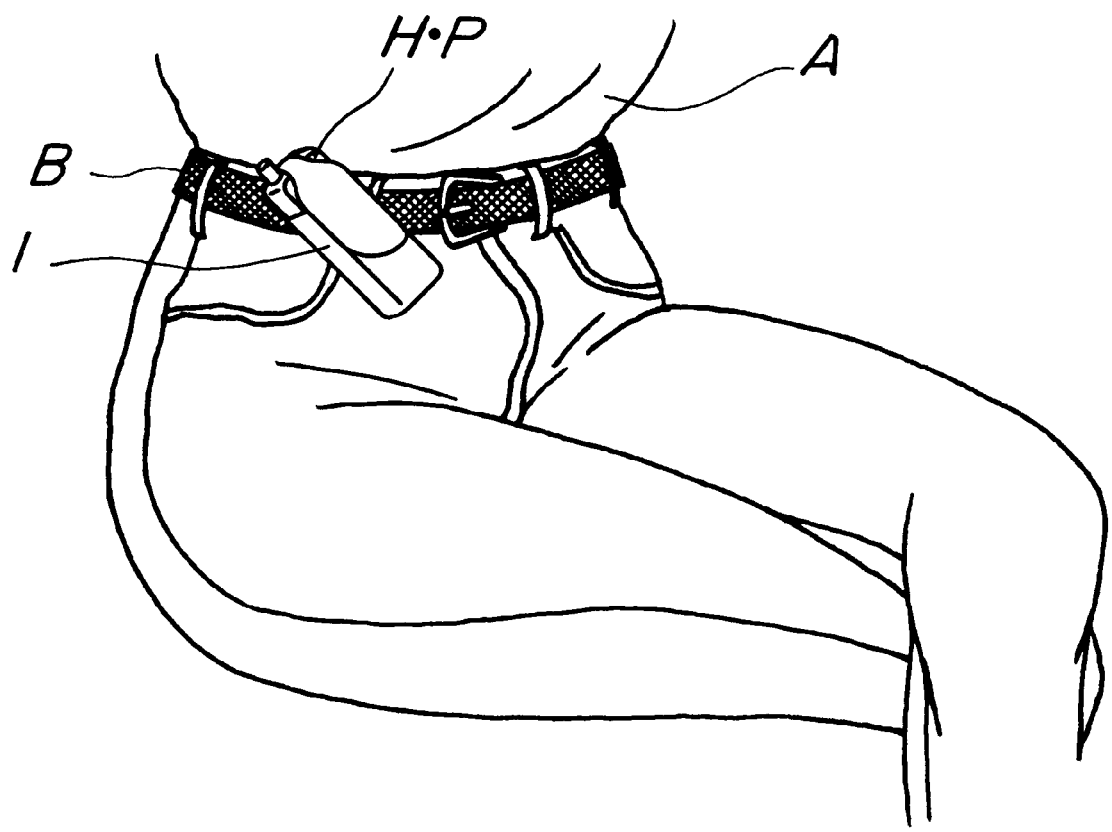
FIG. 9 is a graphic illustrating the portable telephone set holder according to the invention in a backward-leaning state assumed when the user is seated.

According to the embodiment shown in FIGS. 1 to 5, as stated hereinabove, the other end of the suspending section 5 is folded, whereby the folding end portion 5b wraps the side surface 1c of the housing 1. On the other hand, as shown in FIG. 6A, the rear surface 1b of the housing 1 may have a side edge thereof protruded to place thereon the engaging element 7A formed by the surface fastener, whereby the other end 5b of the suspending section 5 is engaged with the engaging element 7B formed by the surface fastener without folding the other end 5b. Alternatively, as shown in FIG. 6B, the engaging element 7A formed by a snap button which is provided on a protruded portion may be snapped by the engaging element 7B formed by a snap button which is provided on the other end 5b of the suspending section 5. In this connection, it is not always necessary that the supporter insertion portion 6 is formed by a single suspending section. Alternatively, as shown in FIG. 7, for instance, it may be formed by a first suspending section 5A and a second suspending section 5C. The first suspending section 5A has one end thereof attached to the rear surface of the housing 1 so as to be inclined with the required angle of inclination, whereby the one end forms a side of the supporter insertion passage. The second suspending section 5C also has one end thereof attached to the rear surface of the housing 1, and is made stretchable by providing a stretchable element 5B such as a rubber belt. In this case, both of the other ends of the first suspending section 5A and the second suspending section 5C may be linked in a disengageable manner, by way of respective engaging elements 5D and 5E each formed by a surface fastener. By this formation, the housing can be mounted on belts with various widths. Further, the first suspending section 5A may have required rigidity so that the user can easily insert the same into the rear side of the belt. Still further, as shown in FIG. 8, the suspending section may be formed by the suspending section 5A alone. That is, the supporter insertion passage 6 is formed by a single insertion strip functioning as the suspending section 5A with the required rigidity, which suspending section has one end thereof securely attached to the housing 1 and the other end thereof formed as a free end. In this case, the supporter of the portable telephone set holder, such as the belt, is inserted from the side of the free end of the insertion strip (suspending section 5A), to thereby form the supporter insertion passage 6 in an engageable manner.

A pocket 9 for small articles may be defined by means of a mid partition 8 in the housing 1 on one side of the same closer to the front surface 1a. The pocket 9 for small articles can accommodate therein, for example, batteries for replacement, a telephone notebook, keys, etc. Further, to prevent the small articles in the pocket 9 from slipping out, an open port of the pocket 9 for small articles is provided with a tonguelike slipout preventing member 9a which extends from the mid partition 8 such that a tip thereof is engaged with the engaging member 4A arranged on the front surface of the housing 1.

Referring to FIG. 2, reference numeral 10 designates a sheet-type electromagnetic wave shielding element attached to the rear surface 1b of the housing 1, which is prepared by sandwiching the rear surface 1b to form a laminate. The electromagnetic wave shielding element 10 functions to shield an electromagnetic wave generated by the portable telephone set H.P from propagating to a human body when the user mounts the same on the belt B. The electromagnetic wave shielding element is preferably formed of a textile fabric covered with a known metallic deposit, from a standpoint of workability, etc. The electromagnetic wave shielding element 10 may be arranged not only on the rear surface of the housing 1 but also on side surfaces and the front surface of the same.

According to the invention, by forming the portable telephone set holder as described hereinabove, the engagement of the suspending section 5 is made easily disengageable. As a result, unlike conventional portable telephone set holders, attachment and detachment of the housing 1 with respect to the belt B are facilitated, which dispenses with disconnection of a buckle from the belt B by the user every time.

Figure 10:
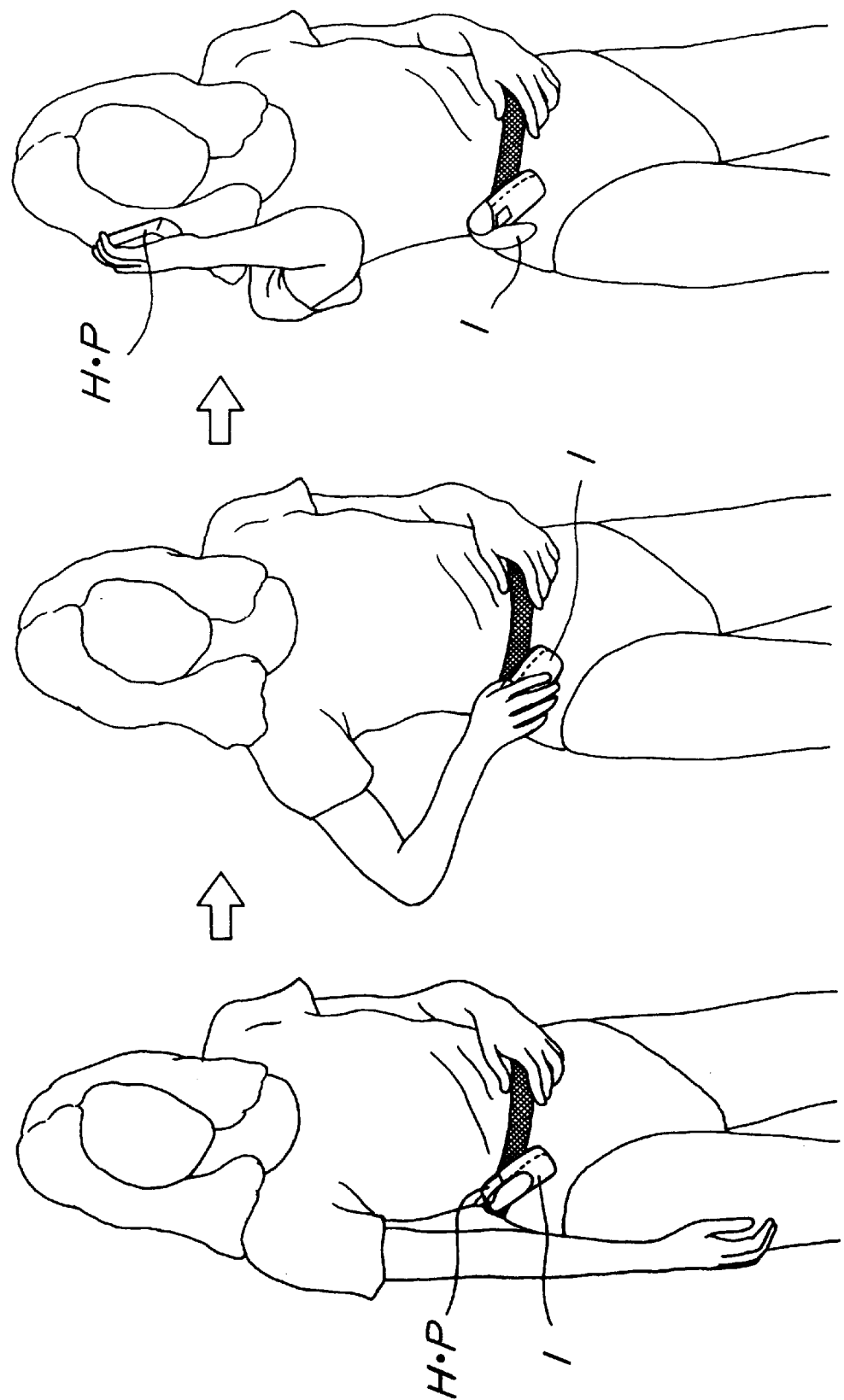
FIG. 10 is a graphic illustrating how the portable telephone set holder according to the invention is used.

Further, the opening surface defined by the cut edge 2a of the insertion port 2 of the housing 1 is inclined in one orientation, and therefore the area of the insertion port 2 is made wider. Further, the supporter insertion passage 6 formed by the suspending section 5 is inclined in the same orientation as the inclination of the cut edge 2a of the insertion port 2 so that the belt B is inserted thereinto, which makes the opening surface face upward. Accordingly, insertion and taking-out of the portable telephone set H.P are facilitated. For example, when the housing 1 is mounted on the belt B, not only the insertion and taking-out of the portable telephone set H.P can be made smooth and quick, as shown in FIG. 10, but also the housing 1 can maintain the backward-leaning state even when the user A is seated, which prevents the housing 1 from being a hindrance to the user A.

Still further, since the sheet-type electromagnetic wave shielding element 10 is attached to the rear surface 1b of the housing 1, an adverse effect of an electromagnetic wave generated by the portable telephone set H.P on the human body, etc. can be prevented.

Figure 11:
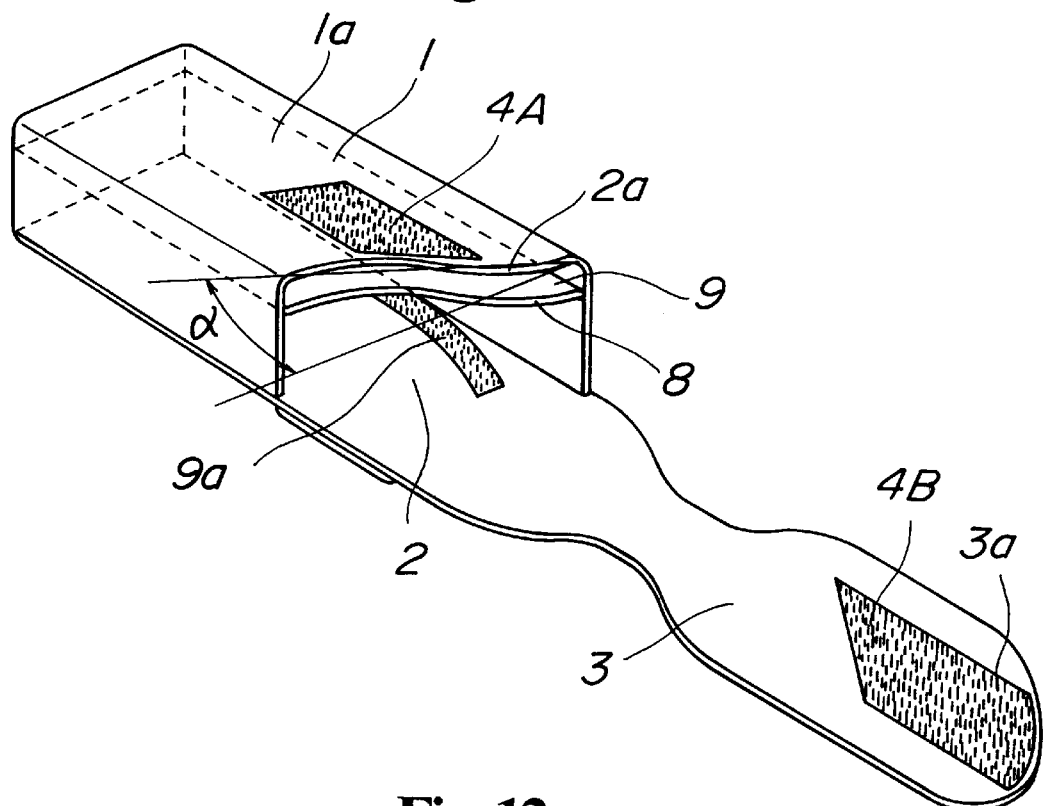
FIG. 11 is a diagram illustrating a portable telephone set holder according to a second embodiment of the invention, in which a holding section thereof is disengaged.

FIG. 11 shows a second embodiment of the invention. According to the present embodiment, the inclined opening surface defined by the cut edge 2a of the insertion port 2 of the housing 1 is formed in a corrugated or a curved state. By the thus formed opening surface, the area of the insertion port 2 can be enlarged.

Figure 12:
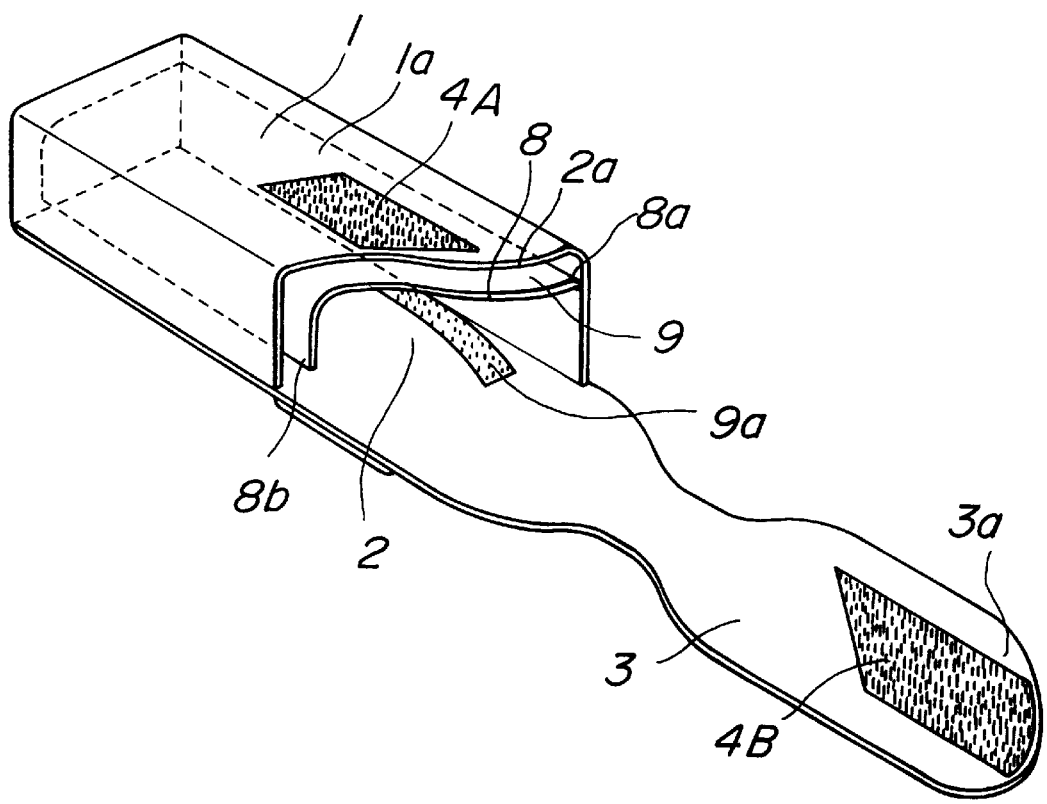
FIG. 12 is a diagram illustrating a portable telephone set holder according to a third embodiment of the invention, in which a holding section is disengaged.

FIG. 12 shows a third embodiment of the invention. According to the present embodiment, the mid partition 8 defining the pocket 9 for small articles within the housing 1 is formed of a flexible material. Further, the mid partition 8 has only one end 8a thereof secured to the housing 1 by bonding or the like, and the other end 8b thereof made as a free end. By this formation, the versatility of the pocket 9 for small articles can be enhanced.

Figure 13:
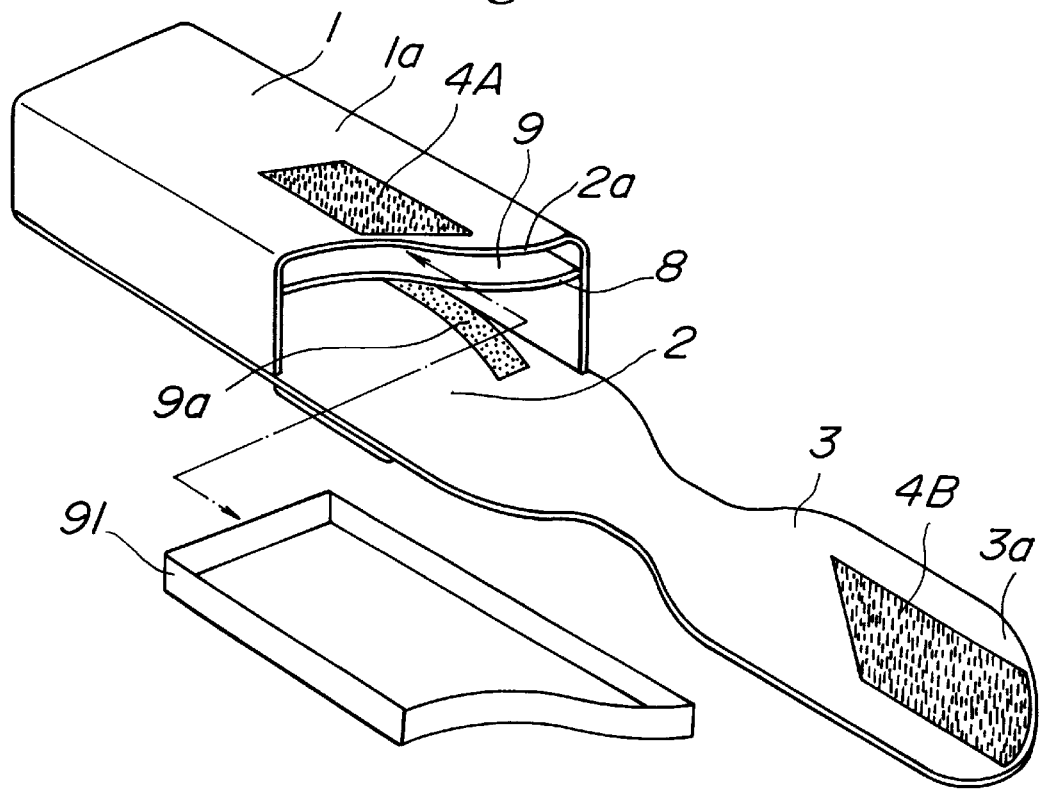
FIG. 13 is a diagram illustrating a portable telephone set holder according to a fourth embodiment of the invention, in which a holding section is disengaged.

FIG. 13 is a fourth embodiment of the invention. According to the present embodiment, the housing 1 is of the construction such that a separate tray-shaped container 91 is housed, in a removable manner, within the pocket 9 for small articles in the housing 1.

Figure 14:
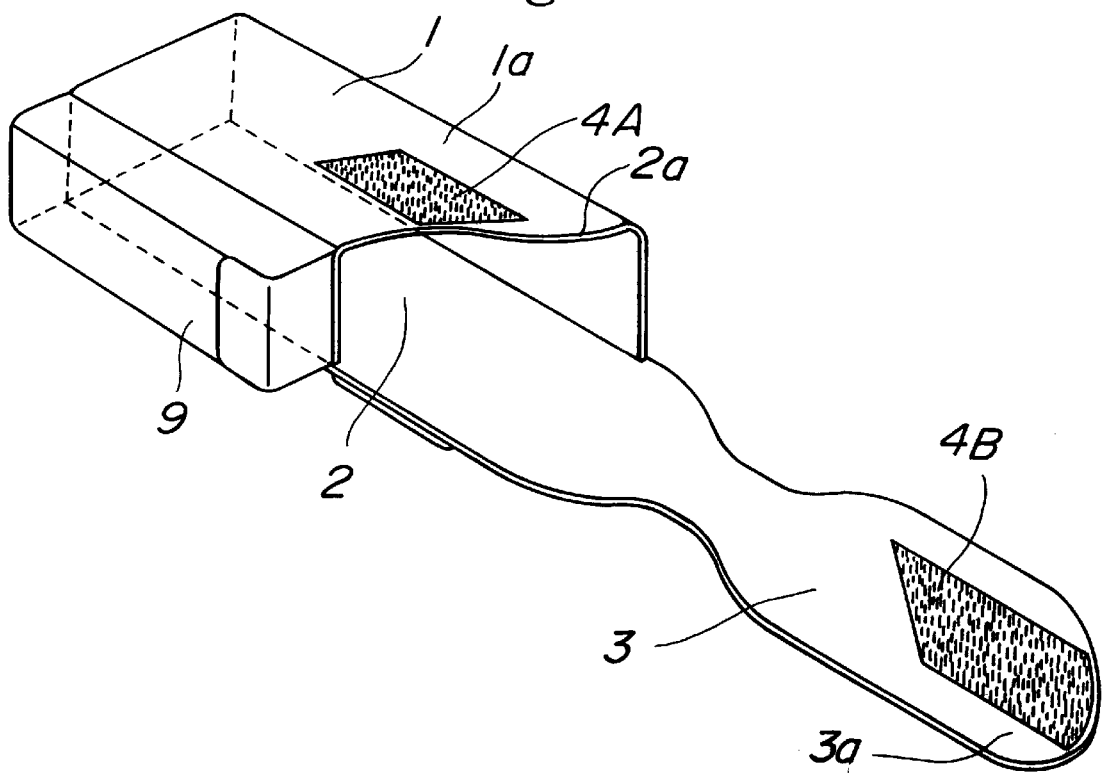
FIG. 14 is a diagram illustrating a portable telephone set holder according to a fifth embodiment of the invention, in which a holding section is disengaged.

FIG. 14 is a fifth embodiment of the invention. According to the present embodiment, the housing 1 is of the construction such that it has the pocket 9 for small articles on the external side surface thereof, which pocket 9 has a gusset and is equipped with a cover.

Figure 15:
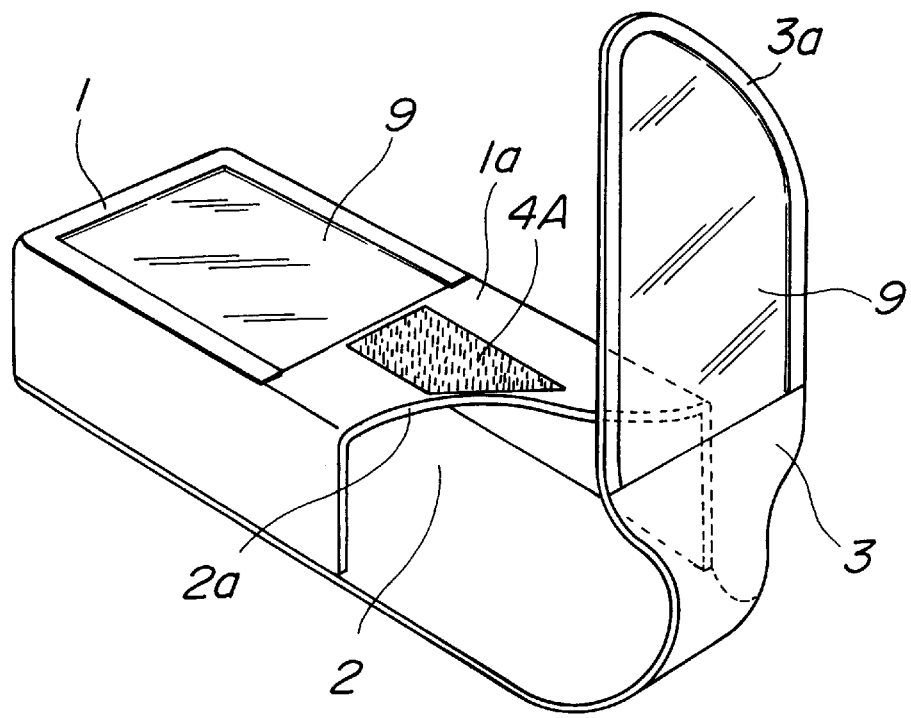
FIG. 15 is a diagram illustrating a portable telephone set holder according to a sixth embodiment of the invention, in which a holding section is disengaged.

FIG. 15 is a sixth embodiment of the invention. According to the present embodiment, the housing 1 is provided with the pockets 9 for small articles on an external side of the front surface 1a of the housing and on the external surface of the holding section 3, respectively. In this embodiment, surfaces of the respective pockets 9 may be transparent.

In the embodiments described above, the leather or an artificial leather is taken as an example of the material of the housing 1, but this is not limitative. Alternatively, for example, the housing may be formed of a material, such as a synthetic resin with flexibility, a paper board, or a resin-bonded paper board. In such a case, the material is preferably subjected to an antistatic finish. Particularly, if the housing is formed of a material which can easily be transformed, even when the shape of the portable telephone set is changed, transformation of the housing can absorb the changed shape of the housing, whereby various types of portable telephone sets can be housed. As a result, the portable telephone set holder with enhanced versatility can be proposed without limiting the types of portable telephone sets.

Figure 16:
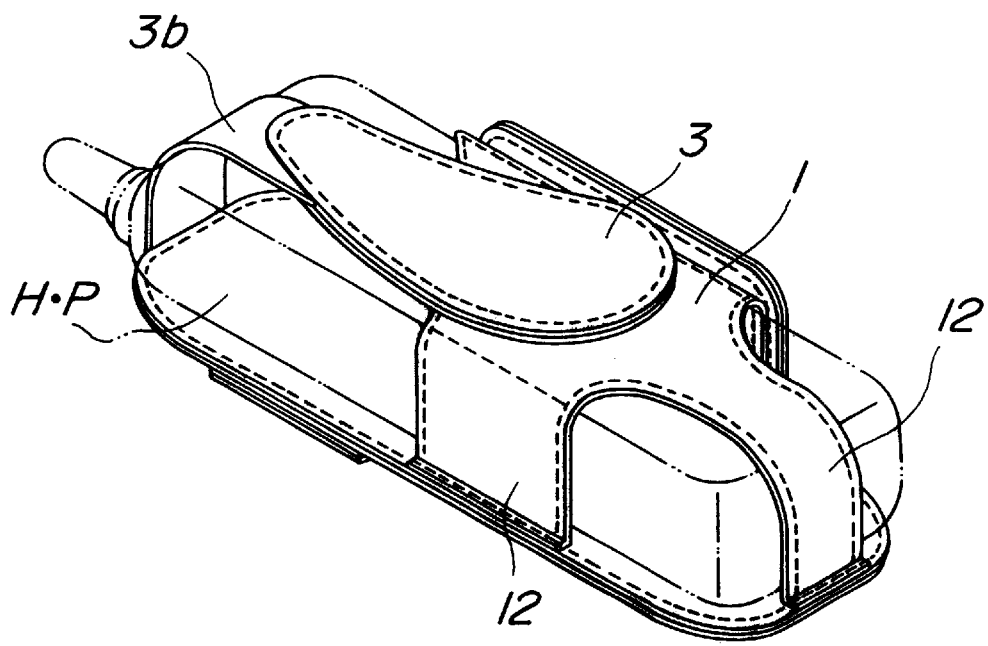
FIG. 16 is a diagram illustrating a portable telephone set holder according to a seventh embodiment of the invention.
Figure 17:
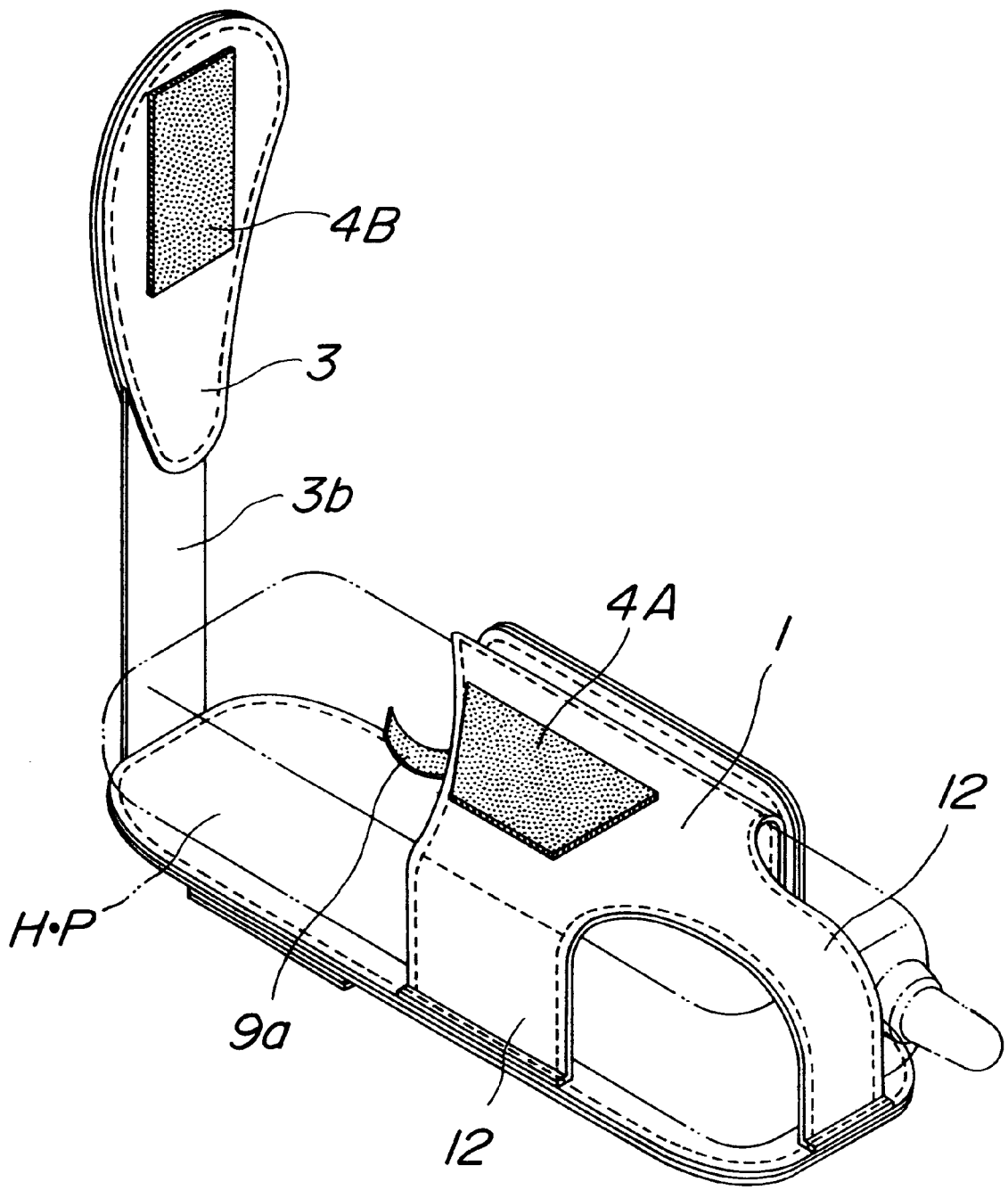
FIG. 17 is a diagram illustrating the portable telephone set holder according to the seventh embodiment of the invention, in which a holding section is disengaged.
Figure 18:
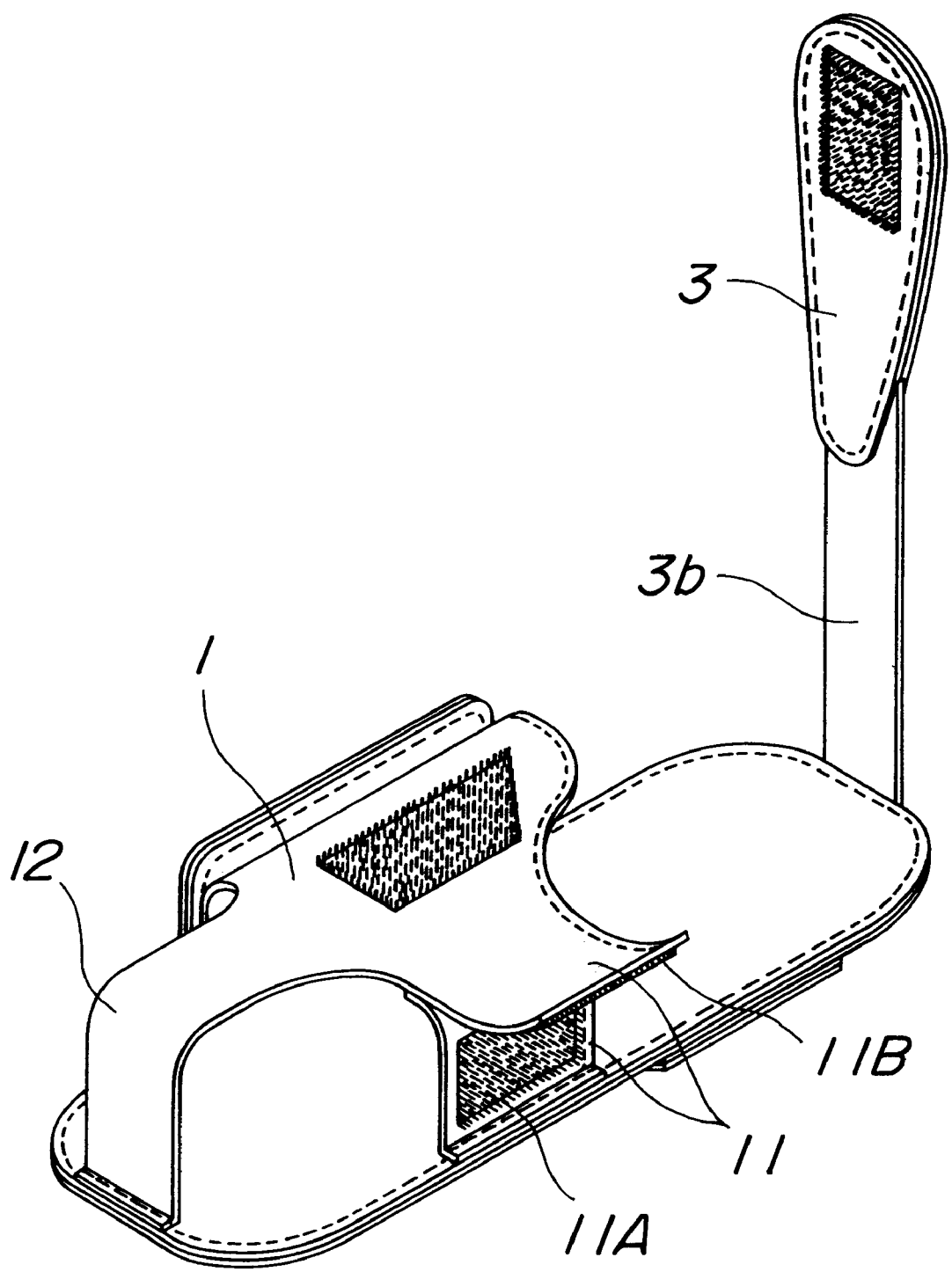
FIG. 18 is a diagram showing a variation of the portable telephone set holder according to the seventh embodiment.
Figure 15:
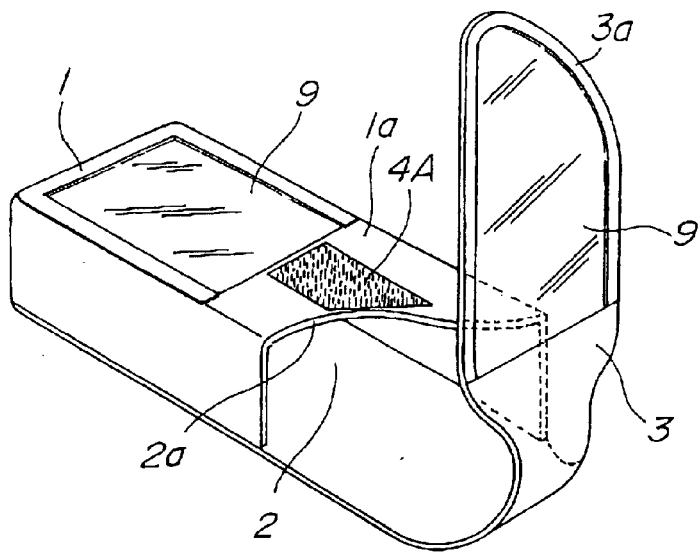
Figure 16:
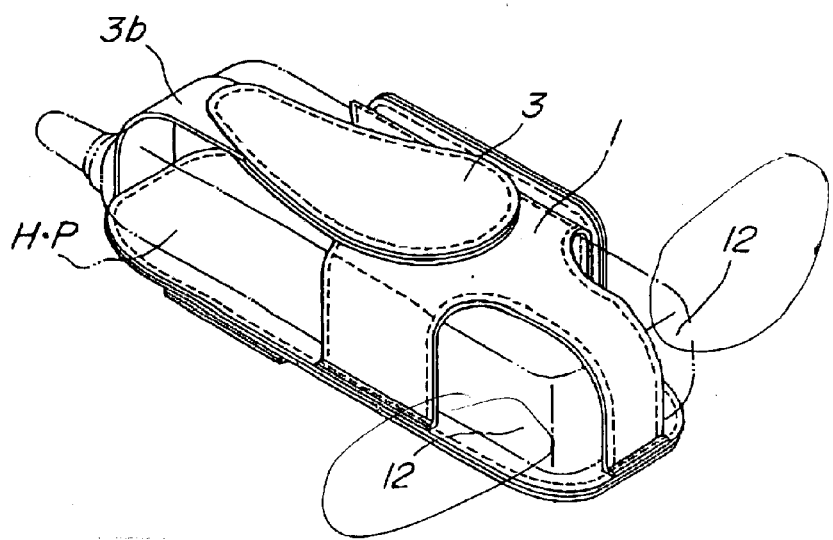
Figure 17:
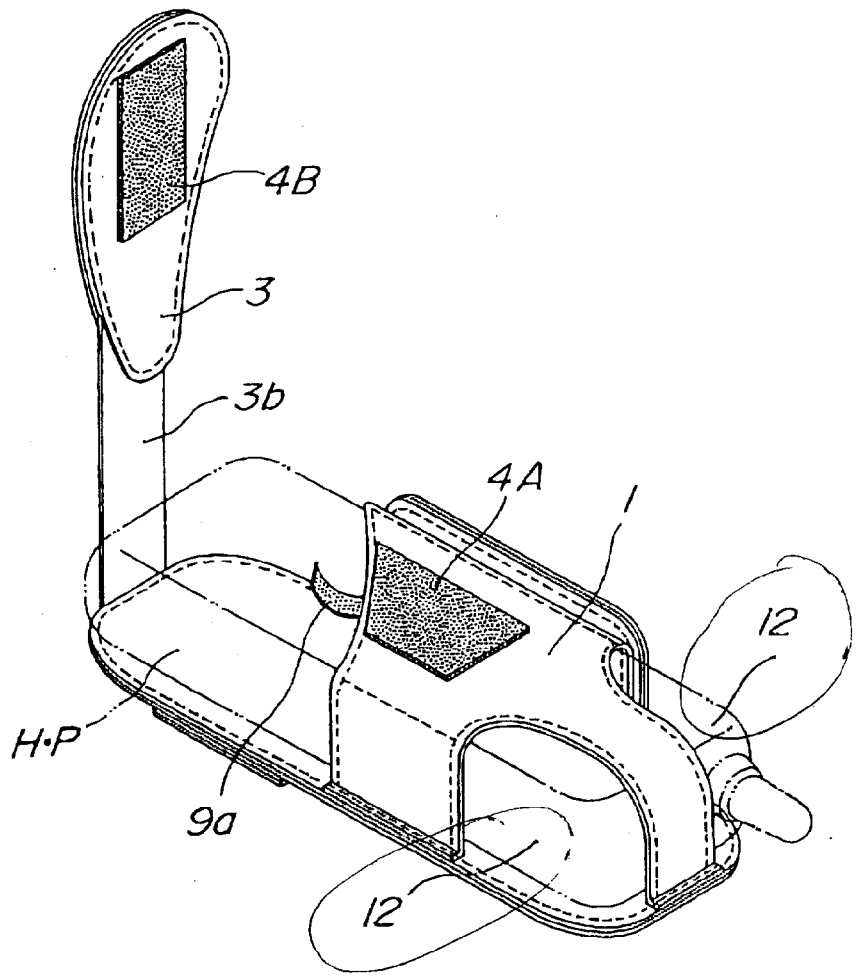
Figure 18:
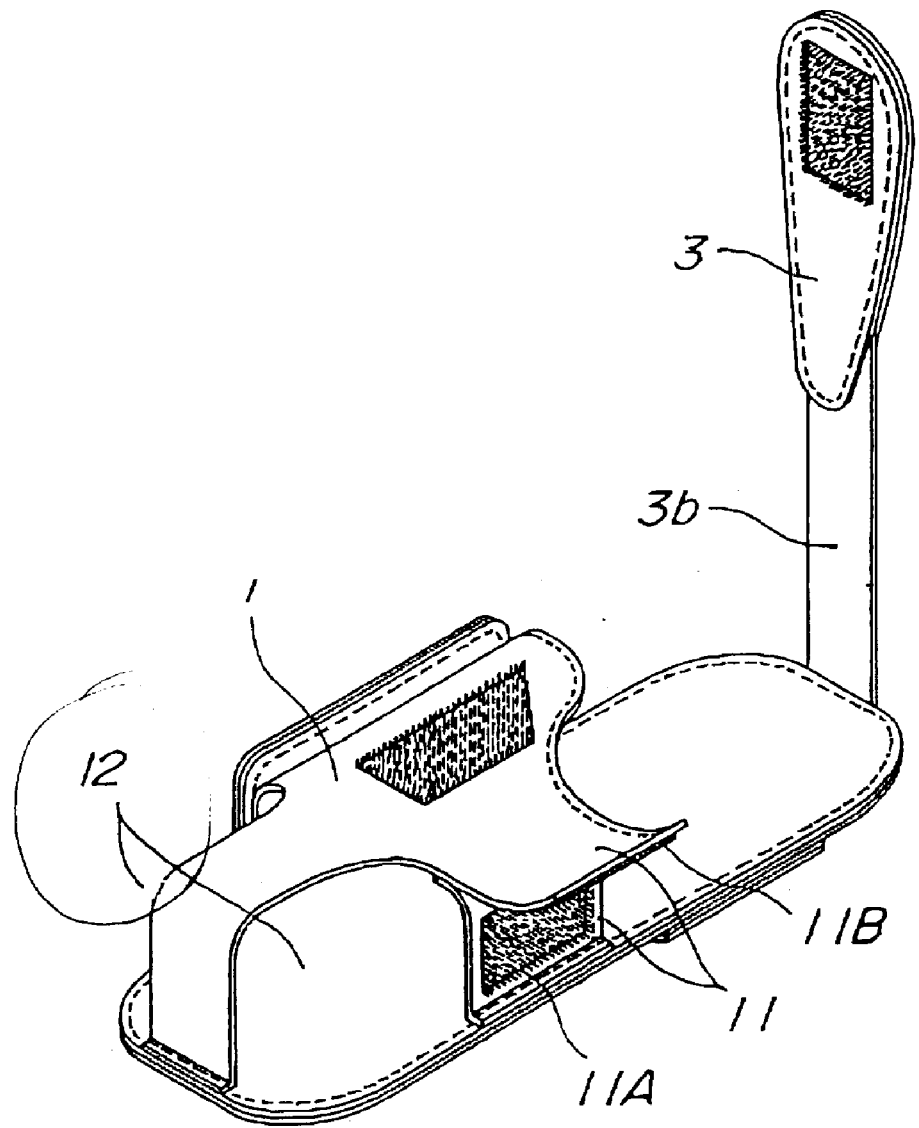

Further, if the holding section 3 is made stretchable, various types of portable telephone sets in different shapes can be housed, which leads to further enhanced versatility. FIGS. 16 to 18 shows a seventh embodiment of the invention. According to the present embodiment, the holding section 3 includes a stretchable material 3b such as a rubber band, and is formed to be stretchable. By stretching the holding section per se. which is engaged with the front surface of the housing 1 which houses the portable telephone set, the difference in shape of various portable telephone sets is absorbed, to thereby surely hold the portable telephone set within the housing 1. In the embodiment shown in FIG. 18, the side surface of the housing 1 is formed such that side surface boards 11 are superposed on each other by way of engaging elements 11A and 11B each formed by a surface fasteners, in a detachable manner. By adjusting the mutual superposition of the side surface boards 11, the housing may have a girth or a periphery thereof extendible. By this superposition, the housing 1 can house any of portable telephone sets in various sizes and shapes.

Still further, according to the embodiment, as shown in the figures, the housing 1 has a bottom in which is formed an opening portion 12. An antenna block C of the portable telephone set H.P is inserted into the opening portion 12 when the portable telephone set H.P is housed in the housing. The opening portion may be formed at least one of the right and left corners of the bottom of the housing 1. In the embodiment shown in the figures, however, the opening portions 12 are formed at both the right and left corners in a pair so as to cope with any portable telephone set having the antenna block at a right shoulder of the main body thereof or at a left shoulder of the same. It is of course unnecessary that the portable telephone set should always be housed in the housing with the antenna block being inserted into the opening portion 12. Alternatively, as shown in FIG. 16, the portable telephone set H.P may be housed such that the bottom of the portable telephone set H.P corresponds to the bottom of the housing 1.

If the opening portion is formed in the bottom of the housing 1, the portable telephone set H.P can be extremely easily taken out of the housing 1 by opening the holding section 3, followed by slightly pressing the bottom of the portable telephone set H.P appearing from the opening portion 12 (when inserted in a forward direction), or the top portion of the portable telephone set H.P (when inserted in a reverse direction). As a result, the operational ease of taking out the portable telephone set can be extremely improved.

Further, the portable telephone set holder according to the invention may have, formed therein, an engagement hole (not shown) for engaging a suspending element such as a strap, etc. of the main body of the portable telephone set. Insertion of the strap into the engagement hole can prevent slipout of the portable telephone set even if the holding section is unexpectedly opened.

Although, in the figures there are exhibited the portable telephone set holders in which the opening surfaces of the respective housings are inclined in different orientations, the user can suitably select one depending on whether he is a right-handed person or a left-handed person, or he carries it on the right side or the left side of his waist.

Portable telephone sets to be housed in the portable telephone set holder of the invention include not only a general portable telephone set and a PHS (Personal Handy phone system), but also mobile telephone apparatuses, such as a satellite portable telephone set, and a handy-type transceiver.

Industrial Applicability

As described hereinabove, according to a portable telephone set holder of the present invention, attachment of a housing to a supporter such as a belt, for suspension, or detachment of the former from the latter can be facilitated. Further, not only insertion and taking-out of the portable telephone set into and from the housing can be smoothly and quickly performed but also the housing can be prevented from being a hindrance to the user. Still further, the portable telephone set holder is apparently sleek with excellent design as well as high fashionable value.

In addition, since the housing has a pocket (or pockets) for small articles formed inside or outside the same, batteries for replacement, a telephone notebook, keys, etc. can be accommodated therein and carried therewith.

Besides, a sheet-type electromagnetic wave shielding element is attached to a rear surface of the housing, and therefore an adverse effect of an electromagnetic wave generated by the portable telephone set on a human body, etc. can be prevented.

What is claimed is:

1. A portable telephone set holder comprising:
   a portable telephone set housing having an insertion port, for housing a portable telephone set inserted from said insertion port;
   holding means extending from said housing and being provided at a location adjacent to said insertion port, for engaging with said housing in a disengageable manner, by being folded toward a front surface of said housing; and
   suspending means for forming a supporter insertion passage into which a supporter for supporting said portable telephone set holder is inserted, on a rear surface of said housing in a disengageable manner;
   wherein an opening surface defined by said insertion port of said housing is inclined in one orientation and said supporter insertion passage is inclined in the same orientation as said one orientation of inclination of said opening surface, and wherein said holding means is made stretchable.

2. A portable telephone set holder as claimed in claim 1, wherein said opening surface defined by said insertion port of said housing is linearly inclined in said one orientation.

3. A portable telephone set holder as claimed in claim 1, wherein said housing has a pocket for small articles, which is formed at inside of said housing.

4. A portable telephone set holder as claimed in claim 3, wherein said pocket for small articles has an open port thereof provided with a slipout preventing member for preventing said small articles accommodated in said pocket from slipping out, in a closable manner.

5. A portable telephone set holder as claimed in claim 1, wherein said housing has a bottom which has an opening portion formed therein.

6. A portable telephone set holder as claimed in claim 1, wherein said housing has a girth thereof made extendible and contractile.

7. A portable telephone set holder as claimed in any of claims 1 to 6, wherein said suspending means have one end thereof securely attached to said housing and the other end thereof engaged with said housing via engaging elements in a disengageable manner.

8. A portable telephone set holder as claimed in claim 1, wherein said supporter insertion passage is formed by an insertion strip with required rigidity, said insertion strip has one end thereof securely attached to said housing and the other end thereof remains free after said supporter is inserted into said supporter insertion passage.

9. A portable telephone set holder comprising:

a portable telephone set housing having an insertion port, for housing a portable telephone set inserted from said insertion port;

holding means extending from said housing and being provided at a location adjacent to said insertion port, for engaging with said housing in a disengageable manner, by being folded toward a front surface of said housing; and suspending means for forming a supporter insertion passage, into which a supporter for supporting said portable telephone set holder is inserted, on a rear surface of said housing in a disengageable manner;

wherein an opening surface defined by said insertion port of said housing is inclined in one orientation and said supporter insertion portion is inclined in the same orientation as said one orientation of inclination of said opening surface; and wherein said supporter insertion passage is formed by connecting a pair of said suspending means to each other via engaging elements each formed by a surface fastener, in a disengageable manner, said pair of said suspending means each having one end thereof securely attached to said housing, and wherein one of said pair of said suspending means is made stretchable.

10. A portable telephone set holder as claimed in claim 9, wherein said housing has at least one surface thereof provided with an electromagnetic wave shielding element.

* * * * *

UNITED STATES PATENT AND TRADEMARK OFFICE
CERTIFICATE OF CORRECTION

PATENT NO.     : 6,478,205 B1
DATED          : November 12, 2002
INVENTOR(S)    : Kouichiro Fujihashi et al.

It is certified that error appears in the above-identified patent and that said Letters Patent is hereby corrected as shown below:

<u>Title page,</u>
Item [57], ABSTRACT,
Lines 10, 12 and 16, please delete "block", insert -- passage --

<u>Drawings,</u>
Please amend Figures 16, 17 and 18 as shown in the attached sheets.

Signed and Sealed this

Twelfth Day of August, 2003

JAMES E. ROGAN
*Director of the United States Patent and Trademark Office*